United States Patent [19]

Capps et al.

[11] Patent Number: 5,544,358
[45] Date of Patent: Aug. 6, 1996

[54] INTERFACE FOR A COMPUTERIZED DATABASE HAVING CARD AND LIST VIEWS

[75] Inventors: Stephen P. Capps, San Carlos; Benjamin W. Sharpe, San Francisco; Gregg S. Foster, Woodside, all of Calif.

[73] Assignee: Apple Computer, Inc., Cupertino, Calif.

[21] Appl. No.: 451,225

[22] Filed: May 26, 1995

Related U.S. Application Data

[63] Continuation of Ser. No. 955,839, Oct. 2, 1992, Pat. No. 5,446,882.

[51] Int. Cl.$^6$ .................................................. G06F 19/00
[52] U.S. Cl. .................. 395/600; 395/100; 364/419.19; 364/DIG. 2
[58] Field of Search ................................... 395/600, 144, 395/650, 575, 934, 700, 800, 100; 364/419

[56] References Cited

U.S. PATENT DOCUMENTS

| Re. 34,476 | 12/1993 | Norwood | 382/13 |
|---|---|---|---|
| 4,428,065 | 1/1984 | Duvall et al. | 364/900 |
| 4,649,499 | 3/1987 | Sutton et al. | 364/518 |
| 4,819,189 | 4/1989 | Kikuchi et al. | 364/521 |
| 5,228,123 | 7/1993 | Heckel | 395/155 |
| 5,241,303 | 8/1993 | Register et al. | 340/706 |
| 5,247,438 | 9/1993 | Subas et al. | 364/400 |
| 5,249,296 | 9/1993 | Tanaka | 395/700 |
| 5,283,862 | 2/1994 | Lund | 395/155 |
| 5,390,281 | 2/1995 | Luciw et al. | 395/12 |
| 5,477,447 | 12/1995 | Luciw et al. | 364/419.08 |

OTHER PUBLICATIONS

CMOS, "Microsoft Windows User's Guide Ver. 3.1", 1990–1992, pp. 434–447.

*Primary Examiner*—Thomas G. Black
*Assistant Examiner*—C. Pham
*Attorney, Agent, or Firm*—Hickman Beyer & Weaver

[57] ABSTRACT

A method for managing a computerized database characterized by the steps of: a) providing a collection of view styles including a card view and a list view; b) selecting an initial view from the collection of view styles; c) determining an initial record index; d) deriving information from at least one record of a computerized database indicated by the record index; e) displaying the information in the selected view style; f) detecting a user input indicating a view style, an index selection, or both; and g) repeating steps d, e, and f in response to the detected user input. The method also includes displaying a card area on a screen of a pen-based computer system which depicts structured information concerning an entity, and displaying a free-form area on the screen depicting unstructured information concerning the entity. A computerized database of the present invention includes a digital computation system having a central processing unit (CPU), memory coupled to the CPU, a display coupled to the CPU, and a mechanism for pointing to selected positions on the display. A card area on the display depicts structured information retrieved from a database stored in the system memory.

24 Claims, 13 Drawing Sheets

INTERFACE FOR A COMPUTERIZED DATABASE HAVING CARD AND LIST VIEWS

This is a continuation of application Ser. No. 07/955,839 filed on Oct. 2, 1992 and now U.S. Pat. No. 5,446,882.

BACKGROUND OF THE INVENTION

1. Field of the Invention

This invention relates generally to computerized databases, and more particularly to graphical interfaces used to query and store data into computerized databases.

2. Description Of the Related Art

Electronic databases are useful in storing, ordering, and retrieving large amounts of data. Electronic databases typically comprise a database program ("software") running on a digital computer system, although a computerized database implemented purely in hardware, or in hardware and firmware, is also possible.

One application for computerized databases is to serve as a Personal Information Manager (PIM). Pocket calculator sized PIMs are made by such companies as Sharp and Casio of Japan, and typically provide such services as calendaring, name and address lists, to-do lists, etc.

Currently available PIMs, while useful, tend to have a cumbersome interface with their databases. This is due to the fact that the primary method for inputting data into these PIMS is with a keypad or keyboard. Even as simple of an operation as inputting a new appointment into a calendar can often take several keystrokes and the traversal of a number of menu items.

A relatively new type of computer which is well suited for use as a PIM is the pen-based computer system. A pen-based computer system is typically a small, hand-held computer where the primary method for inputting data includes a "pen" or stylus. A pen-based computer system is commonly housed in a relatively flat enclosure, and has a dual-function display assembly providing a touch sensitive viewing screen along one of the planar sides of the enclosure. The touch sensitive display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The touch sensitive display assemblies of pen-based computer systems permit users to operate the computer as a computerized notepad. For example, strokes representing character objects, graphic objects, or other object types can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion.

Prior an pen-based computer systems tend to be forms-oriented. For example, these systems may present a user with a form containing a number of fields which can be used to query a database. However, form-type interfaces tend to be awkward and do not take full advantage of the input and display capabilities of the pen-based computer systems.

SUMMARY OF THE INVENTION

The present invention provides a method for managing a computerized database which takes full advantage of the input and display capabilities of pen-based computer systems. The present invention furthermore provides a pen-based computerized database apparatus which presents information in a flexible, intuitive, and easy-to-use fashion.

The method of the present invention includes the steps of: a) providing a number of view styles including at least a card view and a list view; b) selecting an initial view style; c) determining an initial record index; d) deriving information from at least one record of the database indicated by the record index; e) displaying the information in the selected view style on the screen of a computer system; f) detecting a user input indicating a view style, an index selection, or both; and g) repeating steps d, e, and f in response to said detected user input.

The card view preferably includes both a card area for displaying structured information concerning a single person or entity, and a free-form area for displaying unstructured information about that person or entity. The list view is used to display structured information about a number of persons or entities stored in the database.

A computerized database in accordance with the present invention includes a digital computation system having a central processing unit (CPU), memory and a display coupled to the CPU, and a pointing mechanism for pointing to user selected locations on the display. The computerized database further includes at least one record of data pertaining to an entity stored in the memory of the digital computation system, and a card area displayed on the display of the digital computation system which depicts selected structured information concerning the entity. Preferably, the display is provided with a touch-sensitive surface and the pointing mechanism includes a stylus adapted to "click" or "write" upon the touch-sensitive surface of the display.

An advantage of present method and apparatus is that a computerized database can be accessed in an intuitive and natural fashion using a pen-like stylus. Structured information such as names, telephone numbers, etc. can be displayed in familiar business card or telephone list formats, and unstructured information such as notes, sketches, etc. can be stored and accessed in conjunction with the structured information.

These and other advantages of the present invention will become apparent to those skilled in the art upon a reading of the following specification of the invention and a study of the several figures of the drawing.

DETAILED DESCRIPTION OF THE PREFERRED EMBODIMENT

Figure 1:
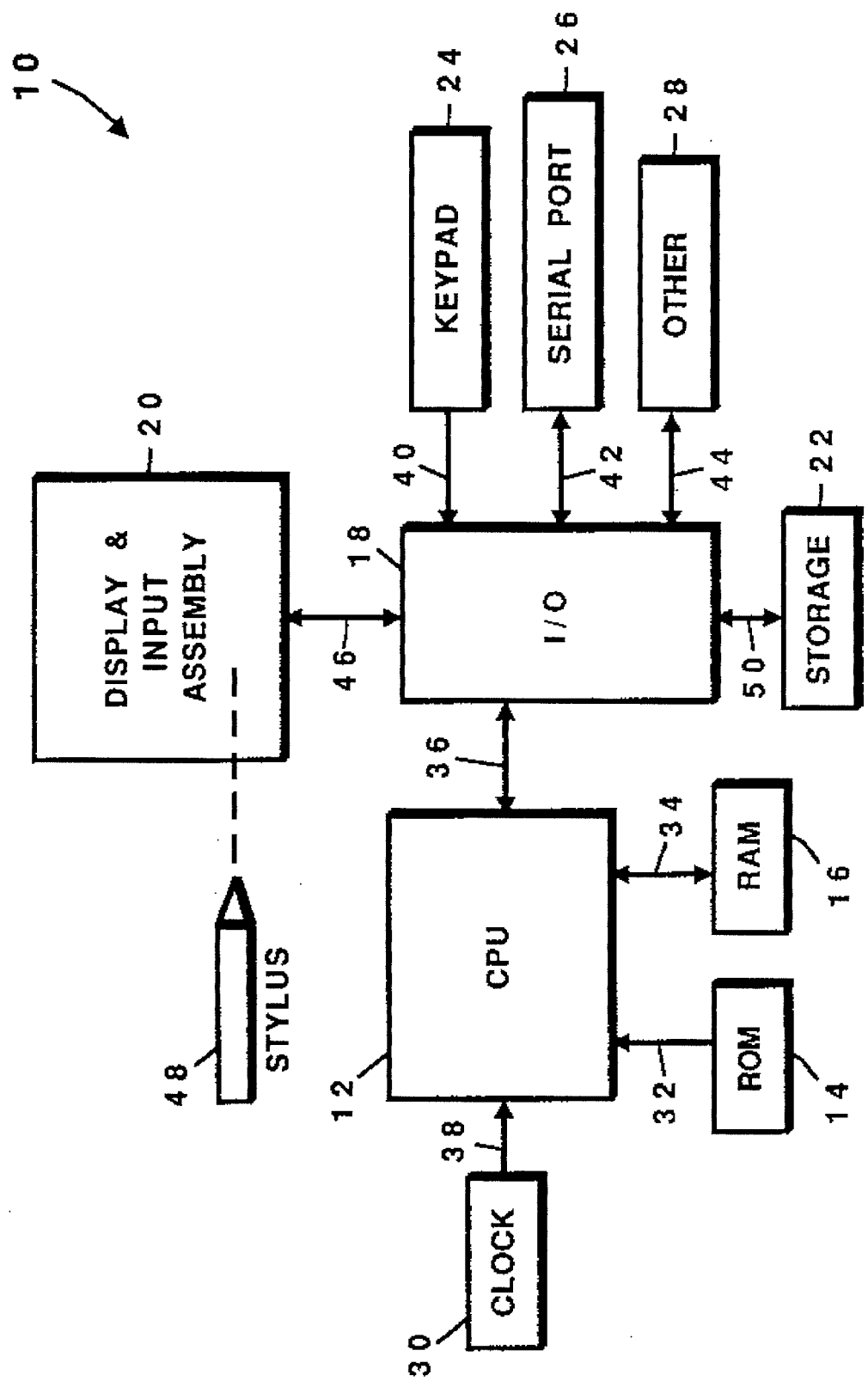
FIG. 1 is a block diagram of a pen-based computer system in accordance with the present invention.

In FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22 such as a disk drive unit or non-volatile memory such as flash memory, an array of input buttons in a keypad 24, a serial port 26, an "Other"I/O port 28, and a clock 30. Other port 28 can be an infrared (IR) port permitting the system 10 to communicate with other data processing systems by IR transmission.

The CPU 12 is preferably a commercially-available, single chip microprocessor. While CPU 12 can be a complex instruction set computer (CISC) chip, it is preferable that CPU 12 be a low power reduced instruction set computer (RISC) chip having a high performance to power ratio. CPU 12 is coupled to ROM 14 by a uni-directional data bus 32. ROM 14 contains the basic operating system for the pen-based computer system 10. CPU 12 is connected to RAM 16 by a bi-directional data bus 34 to permit the use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bi-directional data bus 36 to permit data transfers with peripheral devices, and to the clock 30 by a uni-directional data bus 38.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, keypad 24, serial port 26, and Other port 28. Keypad 24, serial port 26, and Other port 28 are coupled to I/O circuitry 18 by bi-directional data busses 40, 42, and 44, respectively.

Clock 30 provides a series of clock pulses which are used to time various functions and events relating to the computer system 10. The clock 30 can be eliminated and the clock function replaced by a software clock running on CPU 12, but this tends to be a wasteful use of CPU processing power. In the present invention, clock 30 provides clock pulses at 60 hertz (Hz).

Display assembly 20 of pen-based computer system 10 is both an input and an output device. Accordingly, it is coupled to I/O circuitry 18 by a bi-directional data bus 46. When operating as an output device, the display assembly 20 receives data from I/O circuitry 18 via bus 46 and displays that data on a suitable screen. The screen for display assembly 20 is preferably a liquid crystal display (LCD) of the type commercially available from a variety of manufacturers. The input device of display assembly 20 is preferably a thin, clear membrane which covers the LCD display and which is sensitive to the position of a stylus 48 on its surface. These position-sensitive membranes are also readily available on the commercial market. Combination display assemblies such as display assembly 20 which include both the LCD and the input membrane are available from such vendors as Scriptel Corporation of Columbus, Ohio.

Other types of pointing devices can also be used in conjunction with the present invention. While the method of the present invention is described in the context of a pen-based system, other pointing devices such as a computer mouse, a track ball, or a tablet can be used to manipulate a pointer on a screen. Therefore, as used herein, the terms "pointing device", "pointing means", and the like will refer to any mechanism or device for pointing to a particular location on a screen of a computer display.

Some type of mass storage 22 is generally considered desirable. However, the mass storage 22 can be eliminated by providing a sufficient amount of ROM 14 and RAM 16 to store user application programs and data. In that case, the RAM 16 can be provided with a back-up battery to prevent the loss of data even when the pen-based computer system 10 is turned off. However, it is generally desirable to have some type of long term storage 22 such as a commercially available miniature hard disk drive, or non-volatile memory such as flash memory or battery-backed RAM. Mass storage 22 is coupled to the I/O circuitry 18 by a bi-directional bus 50.

In operation, information can be entered into the pen-based computer system 10 by "writing" on the screen of display assembly 20 with the stylus 48. Information concerning the location of the stylus 48 on the screen of the display assembly 20 is input into the CPU 12 via I/O circuitry 18. The CPU 12 then processes the data under control of an operating system and possibly an application program stored in ROM 14 and/or RAM 16. The CPU 12 then produces data which is output to the display assembly 20 to produce appropriate images on its screen.

The aforementioned process produces the illusion that the stylus 48 has an "ink" which appears on the screen of the display assembly 20. Therefore, as used herein, the terms "inking" and "ink" will refer to the process and the result, respectively, of displaying a line or other indicia on the screen of display assembly 20 in response to the movement of stylus 48 on the screen. The when the ink comprises alphanumeric characters, the "inking" may be referred to as "writing" on the screen, and when the ink comprises drawings, the "inking" may be referred to as "drawing" on the screen. The placement of the stylus tip on the screen without substantial movement is sometimes referred to as "tapping" or "clicking" the screen.

Figure 2:
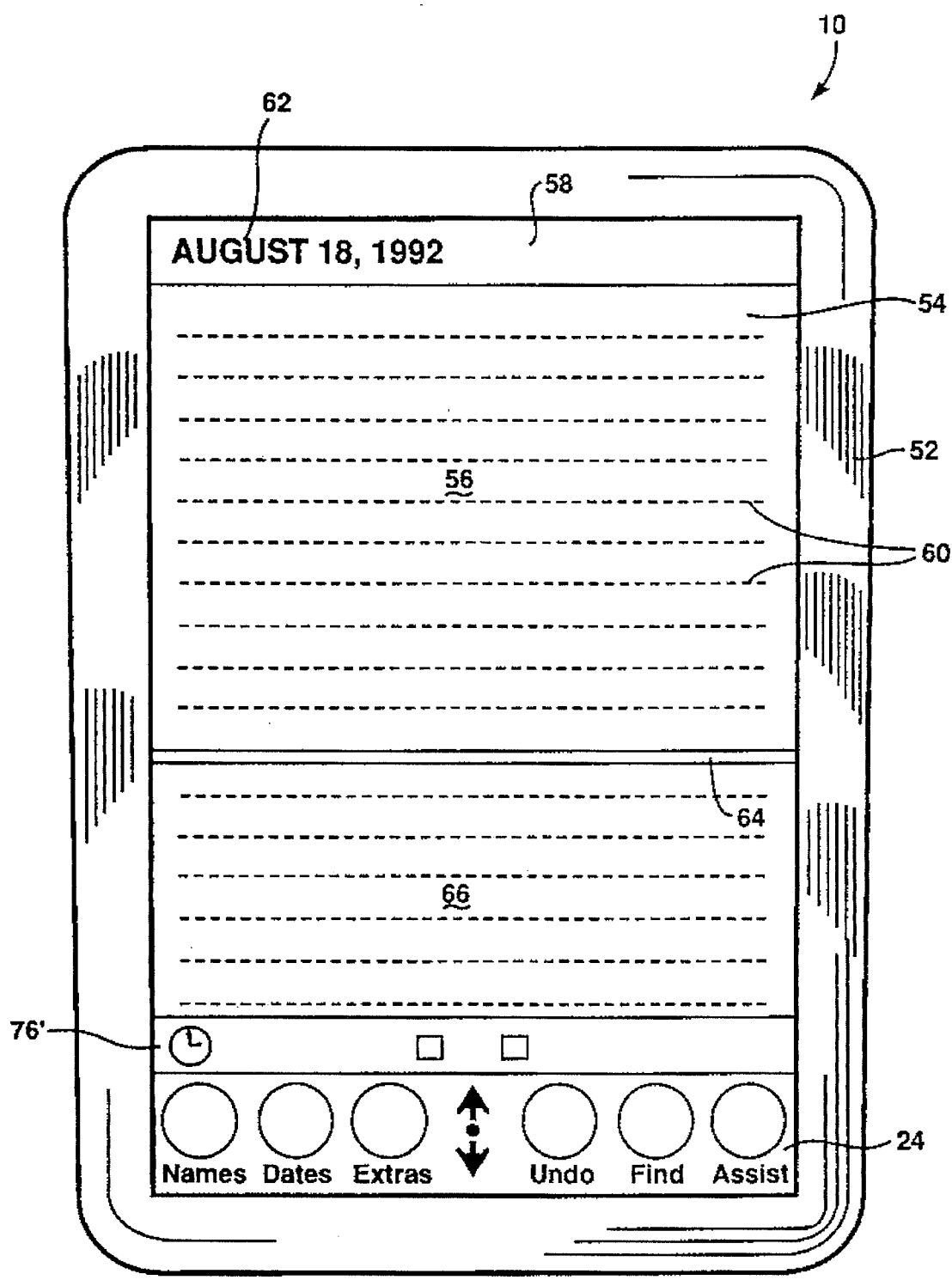
FIG. 2 is a top plan view of a case and a screen for the pen-based computer system of FIG. 1 illustrating a notepad area and a keypad.

In FIG. 2, the pen-based computer system 10 is shown housed within a generally rectangular enclosure 52. The CPU 12, ROM 14, RAM 16, I/O circuitry 18, mass storage 22, and clock 26 are preferably enclosed within the enclosure 40. The display assembly 20 is mostly enclosed within the enclosure 40, but a viewing screen 54 of the display assembly 20 is exposed to the user. As used herein, the term "screen" will refer to the portion of the display assembly 20 which can display an image that can be viewed by a user. Also accessible to the user is the keypad 24.

Upon power-up, pen-based computer system 10 preferably displays on screen 54 an initial note area 56 including a header bar 58 and a number of guidelines 60. The header bar 58 preferably includes the date of creation 62 of the note 56. The optional guidelines 60 aid a user in entering text, graphics, and data into the pen-based computer system 10. Other breaker bars, such as breaker bar 64, may be provided between adjacent note areas, such as initial note area 56 and an adjacent note area 66. A status bar 76' may also be displayed near the bottom of the screen. The status bar 76' is context sensitive, and may have different looks and different features in different applications. A status bar 76 (which is similar to status bar 76') will be discussed in greater detail with reference to FIG. 3. Of course, other initial or "root" screen layouts are also possible.

Figure 3:
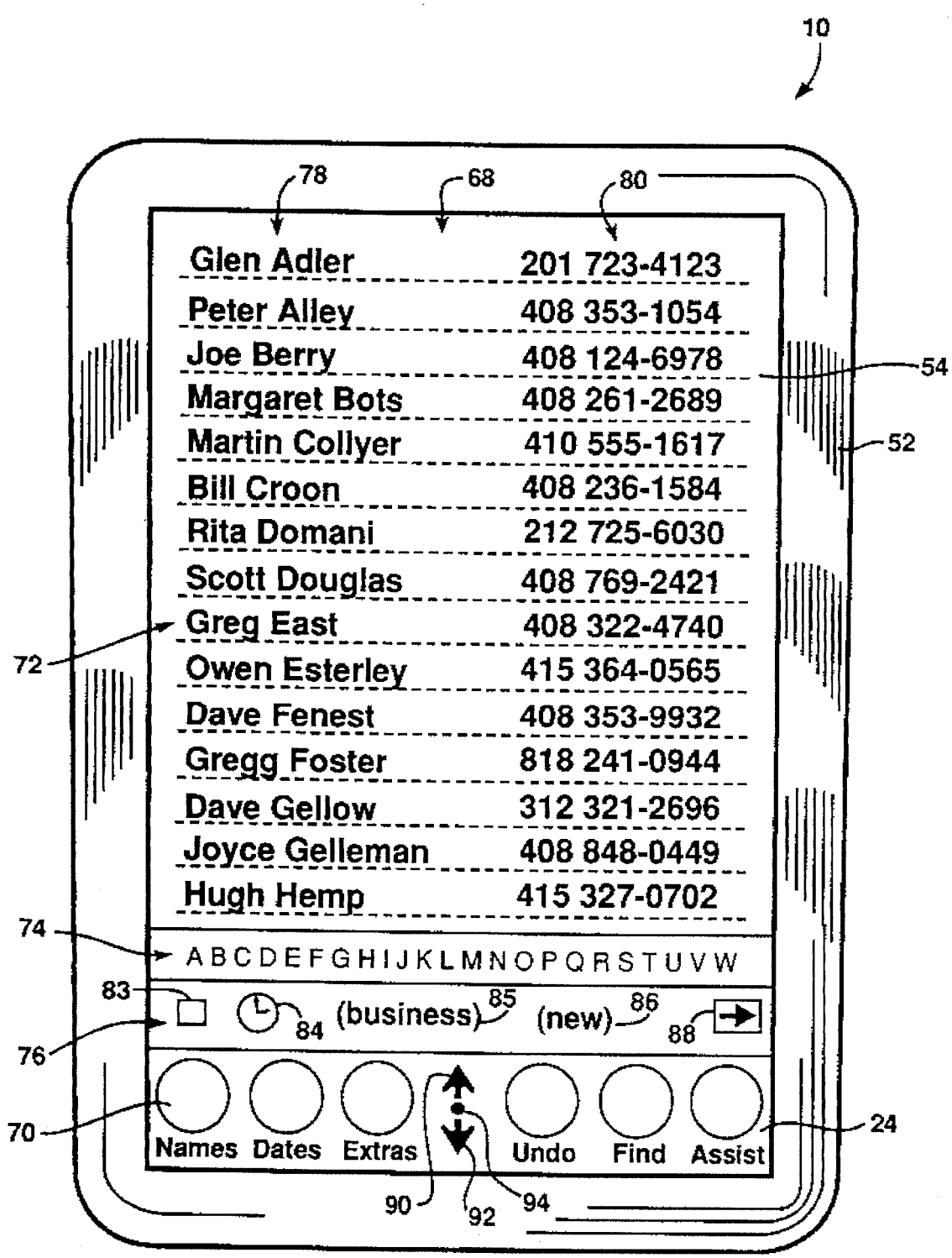
FIG. 3 is a view similar to that of FIG. 2 with an list view display of a name and telephone number database.

FIG. 3 illustrates a "list view" 68 displayed on screen 54 of computer system 10. In this preferred embodiment, the list view 68 is called into view by pressing a "who" button 70 on keypad 24. As will be discussed in detail subsequently, the who button 70 can also call into view a "card view" screen, depending upon certain defaults and user preferences.

The list view 68 includes a number of distinct fields including a list area 72, an tab bar 74, and a status bar 76. The list area 72 includes a name column 78 and a telephone column 80. In this example, the names in name column 78 are arranged in alphabetical order by last name, and range from "Glen Adler" to "Hugh Hemp."

The tab bar 74 displays the letters of the alphabet. When one of the letters of the alphabet is touched with the stylus 48, the first name in the database starting with that letter is displayed at the top of the list area 72 and is highlighted by highlighter bar 82. For example, if the letter "H" were selected from tab bar 74, "Hugh Hemp" would appear at the top of the list area 72, with other names in the database following in alphabetical order. The tab area 74 allows a user to quickly "tab" to a selected area of the database.

The status bar 76 has a number of icons including a close box 83, a clock display 84, a "filter" button 85, a "new" button 86, and an action menu button 88. The close box 83 permits the status bar 76 to be removed from view. The clock display 84 shows the current time in an analog fashion. The filter button 85 causes a menu of filter types (not shown) to appear on the screen. One of the filter types can be selected by touching the screen with the stylus over the desired filter. The currently selected filter is "business". The new button 86 permits a new record (or "card" or "frame", etc.) for an entity to be added to the database. The action menu button causes a menu of actions (not shown) to appear on the screen. Examples of actions presented in the menu can include trashing, faxing, printing, labeling, etc. Again, an action can be selected from the menu by pointing to the action with the stylus.

The list of names and telephone numbers in list area 72 can be scrolled through using a "scroll up" key 90 and a "scroll down" key 92 on keypad 24. A "zoom" button 94 on keypad 24 can be used to toggle between the list view 68 and an alternative view to be discussed subsequently. The alternate view can also be accessed by touching one of the names in the list view with the stylus 48.

Figure 4:
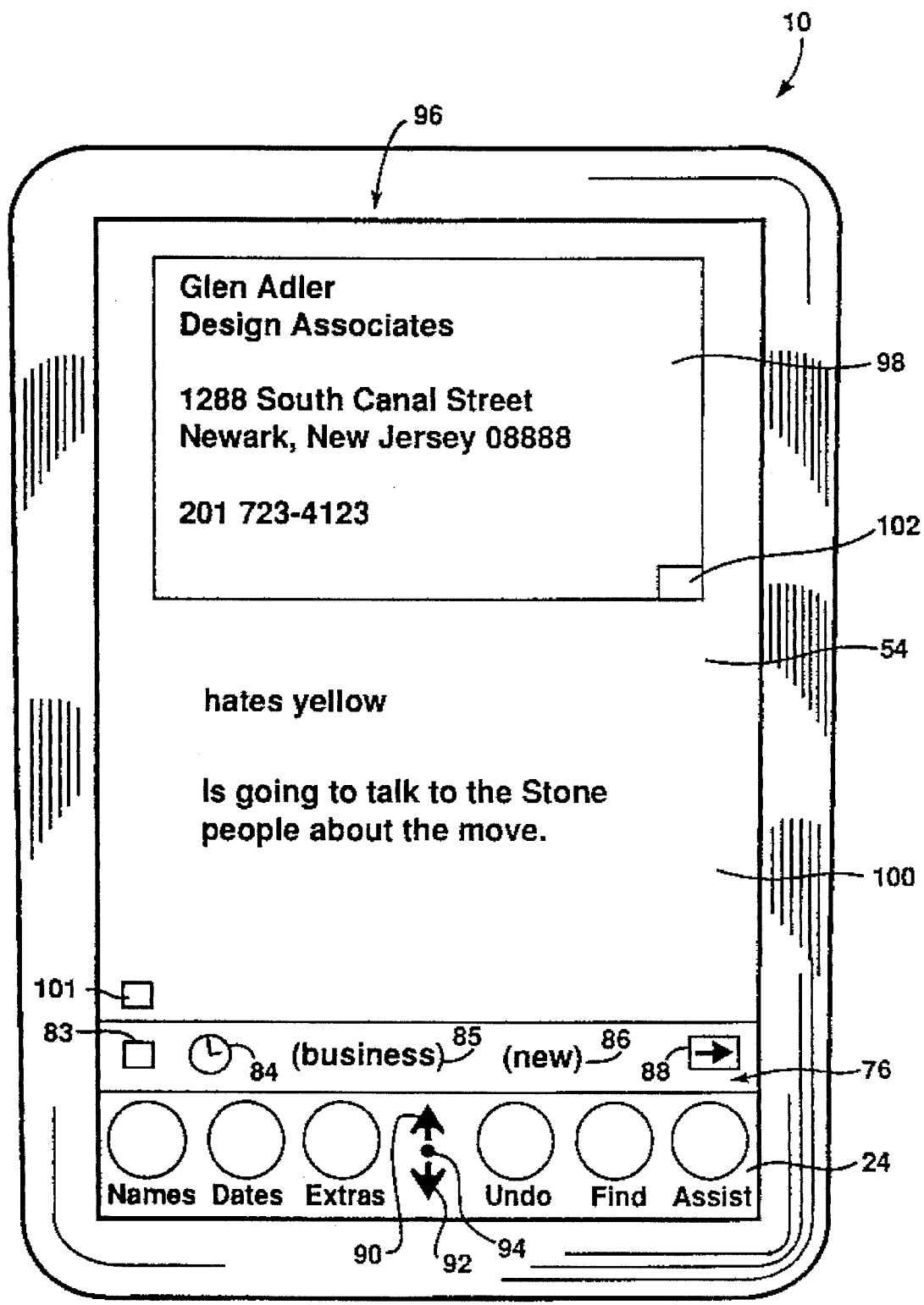
FIG. 4 is a view similar to that of FIGS. 2 and 3 with a card view display of the database.

An alternate or "card view" 96 is shown in FIG. 4. The card view 96, includes a card area 98, a free-form area 100, and the status bar 76. The card area 98 includes selected information concerning a single person or entity which is stored in the database. In this example, the single record is the record containing information about "Glen Adler", and includes his name, business name, address, and telephone number. Other formats with more, less, or the same information can also be provided. An "edit" button 102 is provided in the lower right-hand corner of the card area 98.

Free-form area 100 accepts free-form ink from stylus 48 which may or may not be recognized by recognizer software of system 10. The purpose of free-form area 100 is to provide a doodle or scratch pad area which is associated with a particular record in the database. Scratch pads, free-form inking, and recognizers are well known to those skilled in the art of pen-based computer systems.

The status bar 76 operates in the same fashion as it did with the list view 68 of FIG. 3. The scroll up key 90 permits a user to scroll through the filtered records of the database in a forward alphabetical direction, and the scroll down key 92 permits a user to scroll through the filtered records of the database in a reverse alphabetical direction. The zoom button 94 permits the user to switch to the list view 68.

An additional "zoom" button 101 can also be provided to permit the user to display only the card area 98. Preferably, when the button 101 is activated by the stylus the card area 98 drops down almost to the status bar and the free-form area 100 is obscured. Views beneath the card view screen 96 (such as the notepad area) can be seen in the section of the screen that the card area 98 used to occupy. Pressing the zoom button 101 a second time returns the screen to its original display, as seen in FIG. 4.

Figure 5:
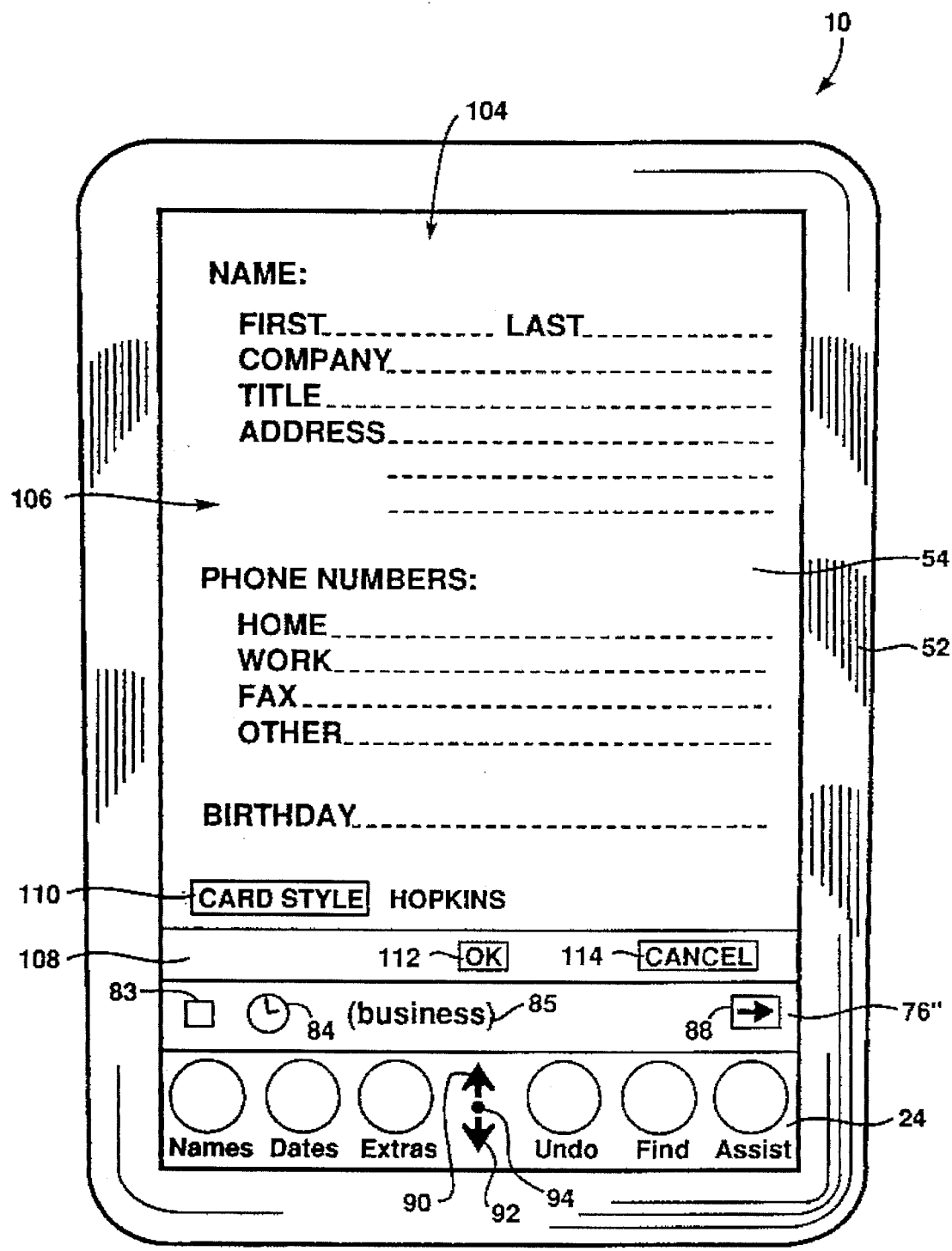
FIG. 5 is a view similar to those of FIGS. 2, 3, and 4 illustrating an editing screen for the database.

FIG. 5 illustrates an edit screen 104 that is called up by pressing the edit "button" 102 in the card view 96 of FIG. 4. The edit screen 104 has three sections: an edit area 106, a command area 108, and the status bar 76.

The edit area 106 includes fields for first and last names, company, title, and address. The edit area also includes fields for various telephone numbers for the individual, including home, work, facsimile (fax) and "other" telephone numbers. Fields for other information, such as the individual's birthday, can also be provided. Finally, the style of the "business card" shown in the card view 92 can be selected by using a card select "button" 110. In this instance, the card style selected is "Hopkins", which produces the business card shown in FIG. 4.

The command area 108 includes two "buttons", namely an "ok" button 112 and a cancel button 114. The ok button 112 enters the information of the various fields of the edit area 106 into the database and then displays the card view screen 96. The cancel button 114 displays the card view 96 without updating the database with the information of the edit area 106, thereby "cancelling" any changes made to the fields of the edit area 106.

A status bar 76" operates in a similar fashion to status bar 76 described previously, except that it has no "new" button, since such a button is redundant in the edit view. The scroll-up button 90 and scroll down button 92 can be used to scroll within edit area 106, or can be inoperative in this view. The zoom button 94 causes the card view 96 to be displayed.

Figure 6A:
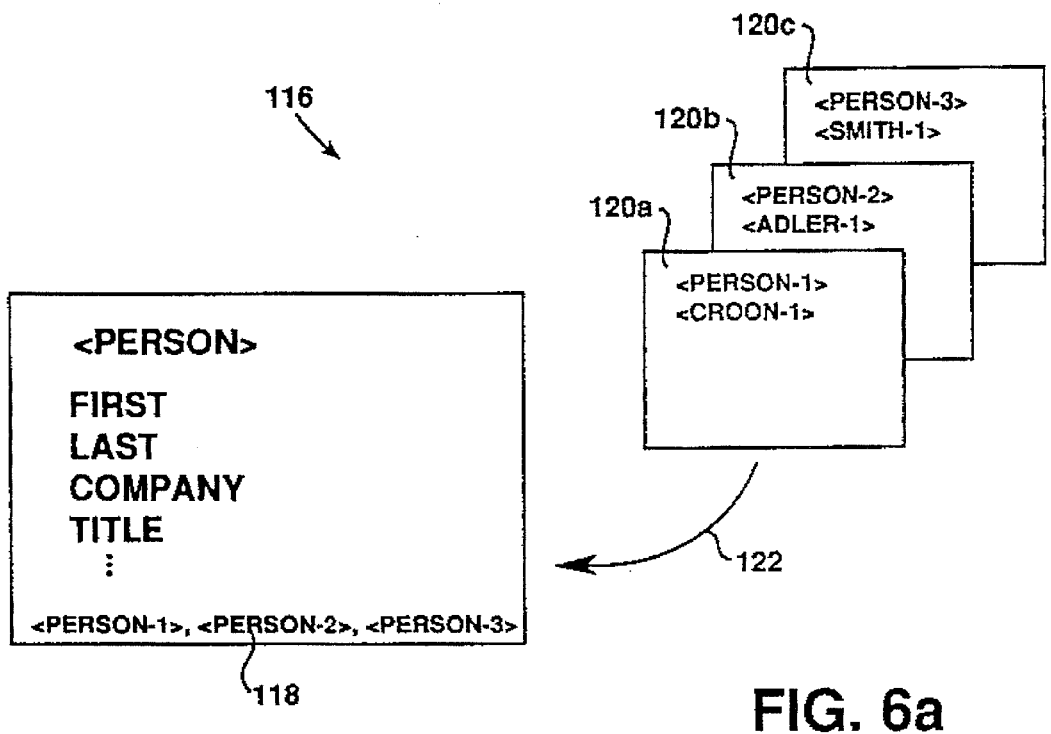
FIG. 6a illustrates the database structure utilized by the present invention.

FIG. 6a illustrates a preferred database structure 116 for implementing the process of the present invention. This preferred database structure is known as a "frame" system, which is a form of semantic network. As is well known to those skilled in the art, a semantic network is a knowledge representation system where unary predicates are treated like types and binary predicates are treated like attributes. Frame systems are a semantic networks with elaborated structure types and attributes. A description of semantic networks and frame systems can be found in "A Fundamental Tradeoff in Knowledge Representation and Reasoning", *Readings in Knowledge Representation*, by Brachman and Leveseque, Morgan Kaufman, San Mateo, 1985.

In FIG. 6a, a frame 118 is a "type" frame of the type <PERSON>. Frame 80 has a number of slots for various attributes of being a person, such as first name, last name, company, title, etc. Frame 118 also includes a list of all frames which are an instance of the type frame <PERSON>, namely <PERSON-1>, <PERSON-2>, and <PERSON-3>.

Frames 120a, 120b, and 120c are "instance" frames of the type <PERSON>. For example, frame 120a is instance <PERSON-1> of frame 118, and has the name <CROON-1>. Frame 120a is provided with the same slots as frame 118 except at least some of the slots are filled with data. For example, the first name slot FIRST of frame 120a may be filled with the name "Bill", and the last name slot LAST of frame 120a may be filled with the name "Croon." Unfilled slots have a null value or can be set to a default value. Likewise, frames 120b and 120c have slots filled with data about the next individuals "Glen Adler" and "Joe Smith." As depicted by the arrow 122, there is a "IS-A" link between the instances frames 120a–120c and the type frame 118 for traversal of the semantic network.

As used herein, the term "database" will refer to the collection of data comprising frames 120 (e.g. frames 120a–120c) and the processes which allow data to be stored into and retrieved from the frames. The individual frames 120 may be referred to as "records" of database 116, although they contain more functionality than simple database records of the prior art. Furthermore, information concerning an individual can be stored in more than one frame in the database, and information concerning multiple individuals can be stored within a single frame. Therefore, as used herein, a "record" is any subset of the database which permits information concerning a particular entity or entities to be retrieved for use in the process of the present invention.

Figure 6B:
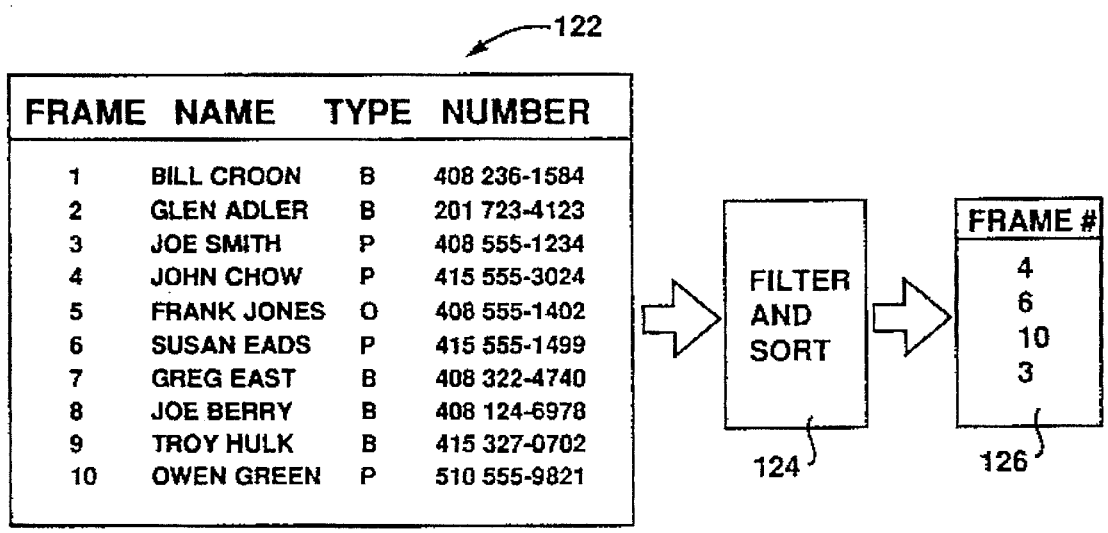
FIG. 6b illustrates a filtering process for information stored in the database.

FIG. 6b illustrates several index lists used to derive data from the database 116 in the present invention. A first index list 122 is a complete, unfiltered, unsorted, numerical list of the frames 120. The index list has four columns listing frame number, name, filter type, and telephone number. This first index list is filtered by a software routine 124 to produce a filtered, sorted list of frame numbers. In this example, the filter and sort routine 124 selects or "filters" only personal (P) filter type frames, and then arranges the P filter type frames in alphabetical order. Therefore, the filtered, alphabetized list 126 lists the frame number 4, 6, 10, and 3 corresponding to the frames 120 for John Chow, Susan Eads, Owen Green, and Joe Smith, respectively. Software routines, such as routine 124, for filtering and alphabetizing lists are well known to those skilled in the art.

Figure 7A:
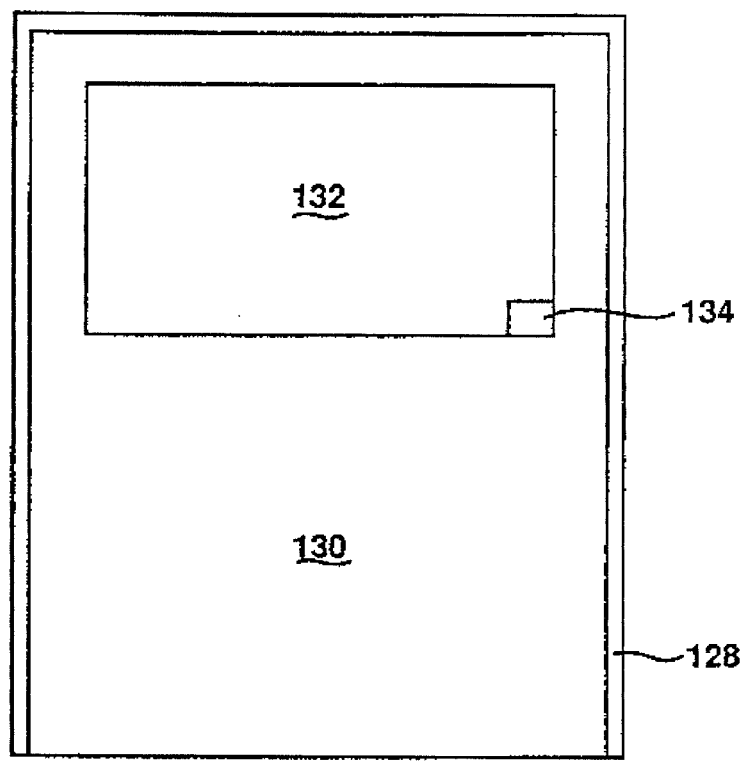
FIGS. 7a and 7b illustrate the view structure utilized by the present invention.
Figure 7B:
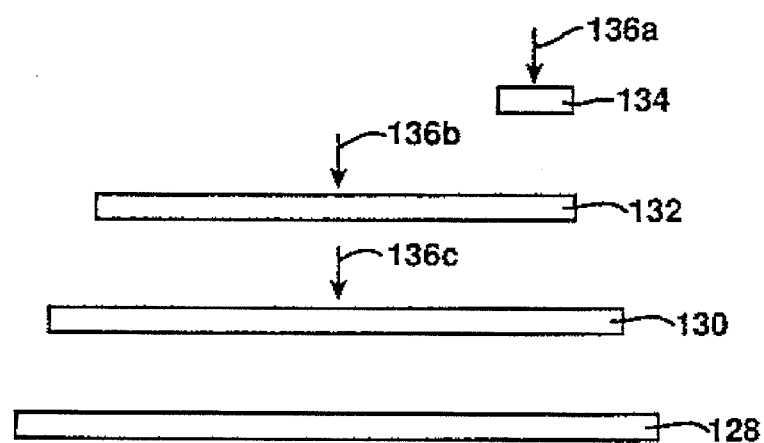

FIGS. 7a and 7b illustrate the "view system" used to enter and display data on screen 54 of system 10. In the view system, various "views" are stacked on top of each other, like pages of paper on a desk top. These views include a root view 128, a first layer view 130, a second layer view 132, and a third layer view 134. Higher order layer views can be similarly provided.

The view system is a software routine which returns two pieces of information when the screen 54 is "tapped" by the stylus 48. A first piece of information returned is the highest order layer that was tapped. For example, a tap 136a on the third layer view 134 will return the information that 134 was tapped, even though the tap was also over the lower order layer views 132, 130, and 128. A tap 136b on the second layer view 132 will return the information that 132 was tapped, even though the tap was also over the lower order layers 130 and 128. Similarly, a tap 136c on an exposed portion of the first layer view 130 will return the information that first layer view 130 was tapped. The second piece of information returned is the position of the tap on the layer view. For example, the view system might return the information that a tap 136b was a tap on second layer view 132 at position (x,y) on the screen 54, where (x,y) are the cartesian coordinates (in pixels or otherwise) of the tap on the screen.

The view system therefore handles much of the routine input work for the system 10. Taps by stylus 48 on non-active areas of the screen 54 can be ignored by the view system. Likewise, inappropriate inputs on active areas of the screen can be ignored or can generate error conditions which may or may not be acted upon by the system.

Figure 8:
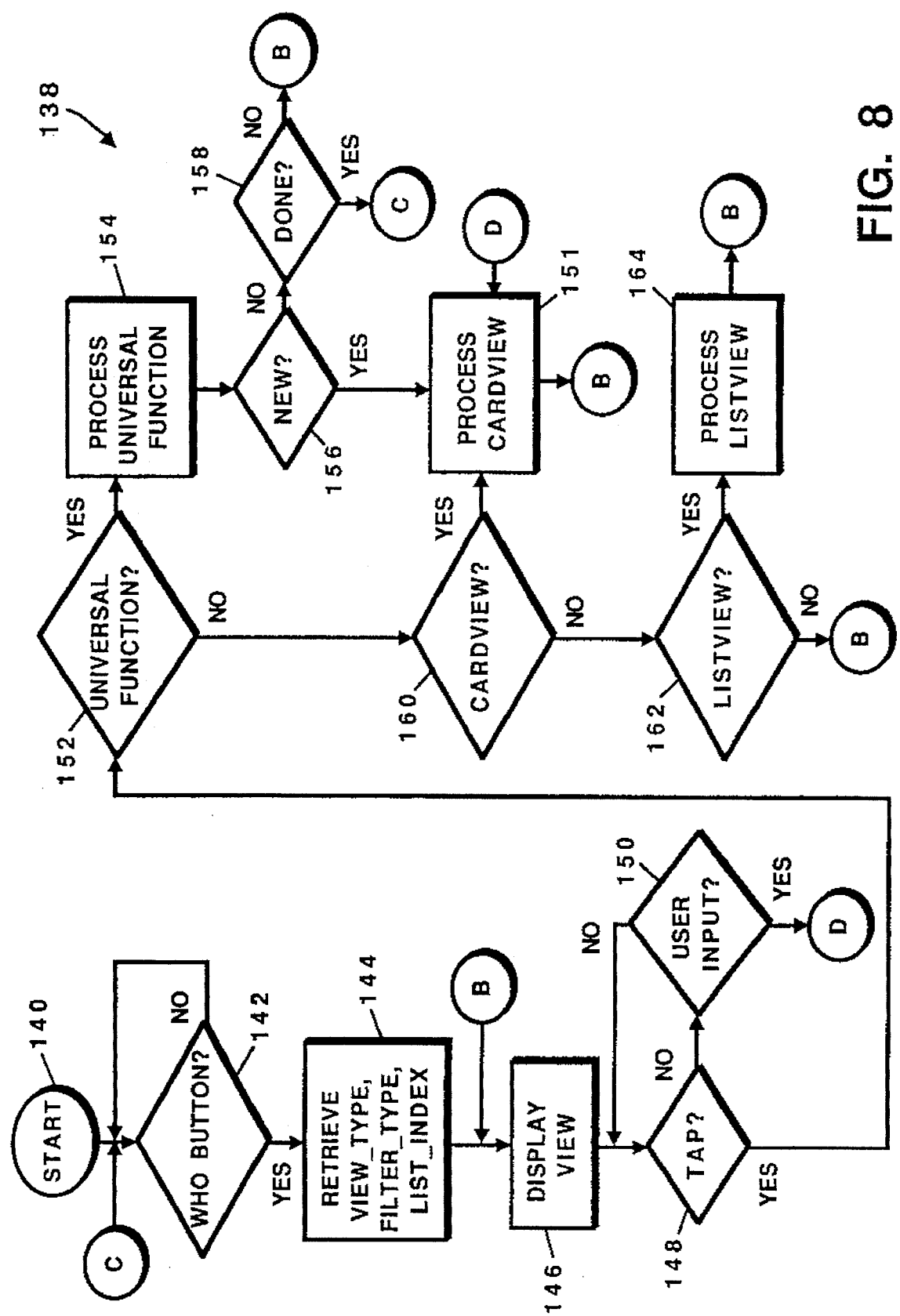
FIG. 8 is a flow diagram illustrating the computer-implemented process of the present invention.

In FIG. 8, a process 138 for managing a computerized database begins at 140. In a decision step 142 it is determined whether the "who" button on keypad 24 has been pressed. If the who button has not been pressed, the process loops back on itself to await the pressing of the who button. Of course, other system and user functions can be taking place while the decision step 142 waits for the pressing of the who button. The pressing of the who button can therefore be thought of an as interrupt signal which alerts the system that a user wishes to access the database.

Next, in a step 144, a number of variables are retrieved from memory (such as RAM 16) including the variables VIEW_TYPE, FILTER_TYPE, AND LIST_INDEX. The variable VIEW_TYPE determines the type of view of the database that will be displayed by the system. The variable FILTER_TYPE determines which record types will be displayed. Finally, the variable LIST_INDEX is a pointer to the current record number.

Each of these variables VIEW_TYPE, FILTER_TYPE, AND LIST_INDEX will have an initial value as determined by step 144. This initial value can be a predetermined value. For example, VIEW_TYPE could always be initially LIST-VIEW or could always initially be CARDVIEW. Alternatively, the variables could be some default value, such as the most frequently used previous value for that variable. Also, the variables have a value equal to their last used value, e.g. if a user was in card view the last time he or she was using the database, then the VIEW_TYPE would initially be CARDVIEW.

In step 146 the view determined by VIEW_TYPE is displayed on the screen 54. In this preferred embodiment, VIEW_TYPE is either LISTVIEW (as illustrated in FIG. 3) or CARDVIEW (as illustrated in FIG. 4). The mechanics of producing such views are well known to those skilled in the art. For example, step 146 can be readily implemented by graphics software such as QUICKDRAW from Apple Computer, Inc. of Cupertino, Calif. A description of the QUICK-DRAW graphics software is found in the book *Inside Macintosh, Volumes I, II, and*, by C. Rose et al., Addison-Wesley Publishing Company, Inc., July 1988.

In a decision step 148 it is determined whether a user has "tapped" the screen 54. By "tapped" it is meant herein that a user has placed the tip of stylus 48 somewhere on the active portion of the screen 54. If not, then a decision step 150 determines whether there is any other user input, such as the pressing of one of the buttons 90, 92, or 94 of the keypad 24. If not, steps 148 and 150 are repeated until there is either a tap or some other user input. If step 150 determines that there is a user input, process control jumps to a point D to process a step 151 "Process Card View", to be discussed subsequently. Again, other processes can be operating on the system 10 while steps 148 and 150 are being performed.

If a tap is detected in step 148, a decision step 152 determines whether a "universal function" is being requested. If so, then the universal function is processed in a step 154 and then in a decision step 156 it is determined whether a new record is to be created. If so, then step 151 "Process Card View" is performed, and process control is returned to point B, i.e. step 146. If a new record is not to be created as determined by step 156, a decision step 158 determines whether the user is done with the process 138, i.e. whether the user wishes to exit the cardfile function. If so, process control is returned to point C, step 142, and if not then process control is returned to point B, step 146.

If decision step 152 determines that a universal function is not indicated by the tap detected by step 148, a decision step 160 determines whether the card view is being requested. If so, then step 151 "Process List View" is performed, after which process control is returned to point B.

If decision step 160 determines that a card view is not being indicated by the tap, then a decision step 162 determines whether the user is requesting the list view. If so, then a step 164 "Process List View" is performed, and process control is returned to point B. If not, then process control is returned directly to point B.

It should be noted that many of the steps are preferably automatically performed by the aforementioned view system. For example, decision steps 148, 150, 152, 160, and 162 can be implemented as a part of the view system. In other words, the view system determines what function is being requested by a user's tap, and automatically branches to the appropriate routine to be processed. Again, the operation of view systems are well known to those skilled in the art.

Figure 9:
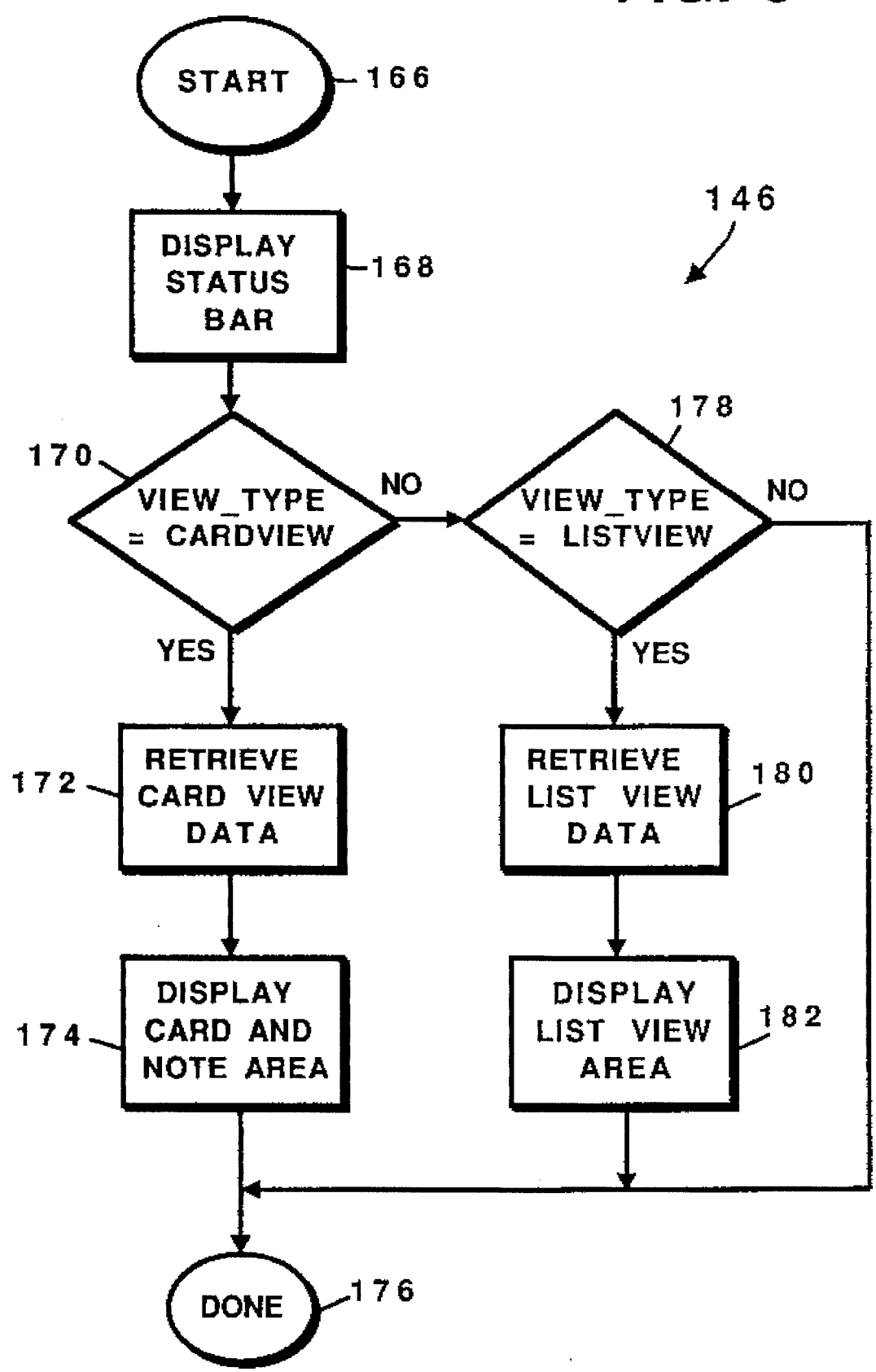
FIG. 9 is a flow diagram further illustrating the "Display View" step 146 of FIG. 8.

FIG. 9 illustrates the process 146 "Display View" of FIG. 8 in greater detail. Process 146 begins at 166, and status bar 76 is displayed in a step 168. Again, QUICKDRAW graphics software can be used to accomplish this step 168.

In a decision step 170, it is determined whether the variable VIEW_TYPE is equal to CARDVIEW. If it is, the data is retrieved corresponding to record number LIST_INDEX in a step 172, and the data is displayed in the card and note area in card view format in a step 174. Process 146 is then completed as indicated at 176.

If decision step 170 determines that the variable VIEW_TYPE is not equal to CARDVIEW, then a decision step 178 determines whether VIEW_TYPE is equal to LISTVIEW. If it is not, then the process 146 is completed as indicated at 176. If the VIEW_TYPE is equal to LISTVIEW, then the list view data is retrieved in a step 180. The list view data begins with the record LIST-INDEX and includes a number of subsequent records, e.g. an additional 14 records. Once the list view data has been received, it is displayed in the list view area in a step 182. The process 146 is then completed as indicated at 176.

Figure 10:
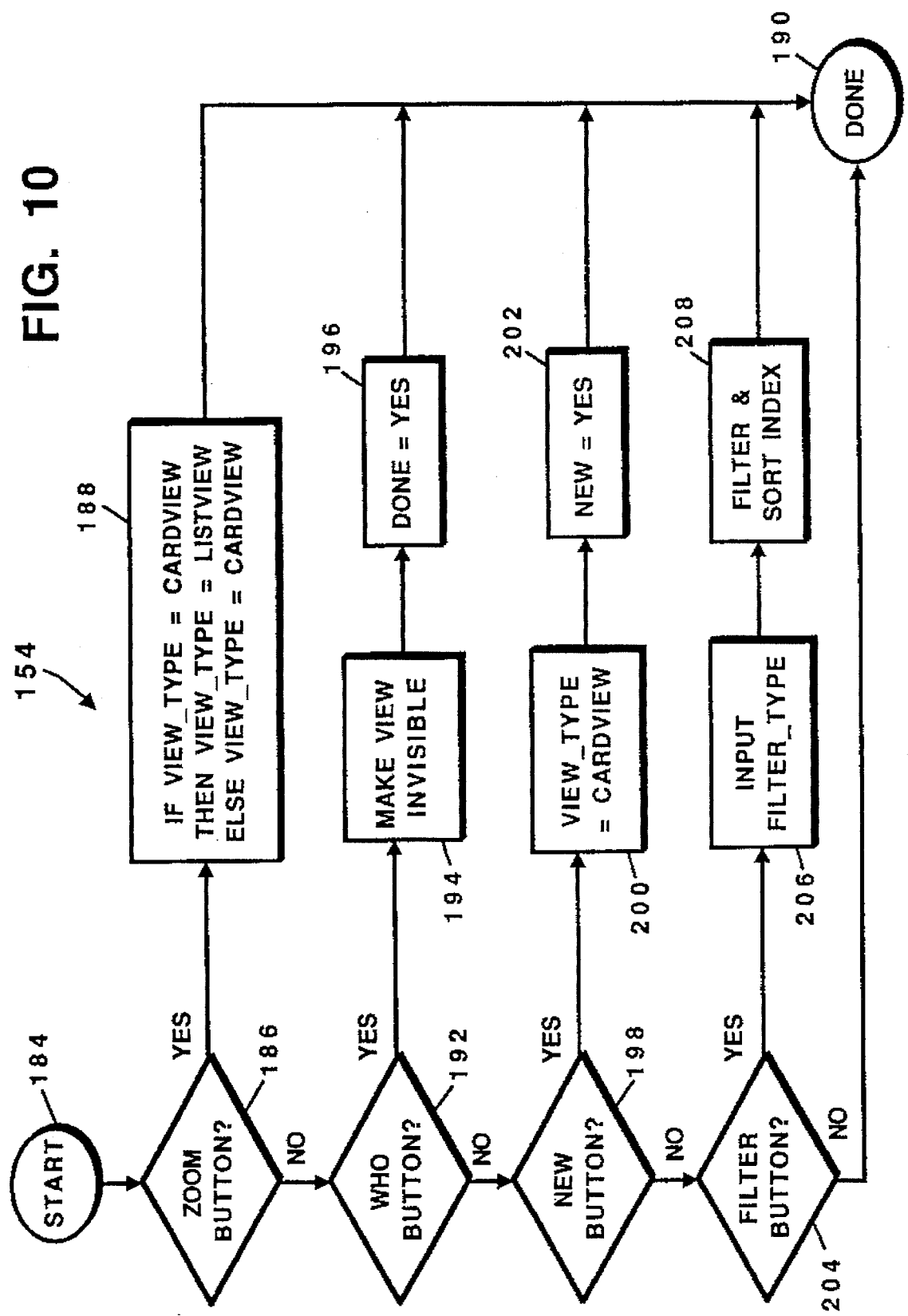
FIG. 10 is a flow diagram further illustrating the "Process Universal Function" step 154 of FIG. 8.

In FIG. 10, the "Process Universal Function" step 154 of FIG. 8 is illustrated in greater detail. The process 154 begins at 184 and a decision step 186 determines whether the zoom button 94 has been activated. If it has, a step 188 reverses the view type, i.e. if VIEW_TYPE= CARDVIEW then VIEW_TYPE is set to LISTVIEW and if VIEW_TYPE≠CARDVIEW then VIEW_TYPE is set to CARDVIEW. The process 154 is then completed as indicated at 190.

If the zoom button has not been pressed, a decision step 192 determines whether the who button 70 has been pressed. If it has, the current view is removed from the screen ("made invisible") in a step 194, and a flag DONE is set to YES in a step 196. The process is then completed as indicated at 190.

If the who button has not been pressed, a decision step 198 determines whether the new button 86 has been pressed. If so, the VIEW_TYPE is set to CARDVIEW in a step 200 and a flag NEW is set to YES in a step 202. Process 154 is then completed as indicated at 190.

Finally, if the who button has not been pressed a decision step 204 determines whether the filter button 84 has been pressed. If not, the process 150 is completed as indicated at 204. If the filter button 84 has been pressed, the FILTER_TYPE is read from memory in a step 206, and the database is filtered and sorted in a step 208. The process 154 is then completed as indicated at 190.

Figure 11:
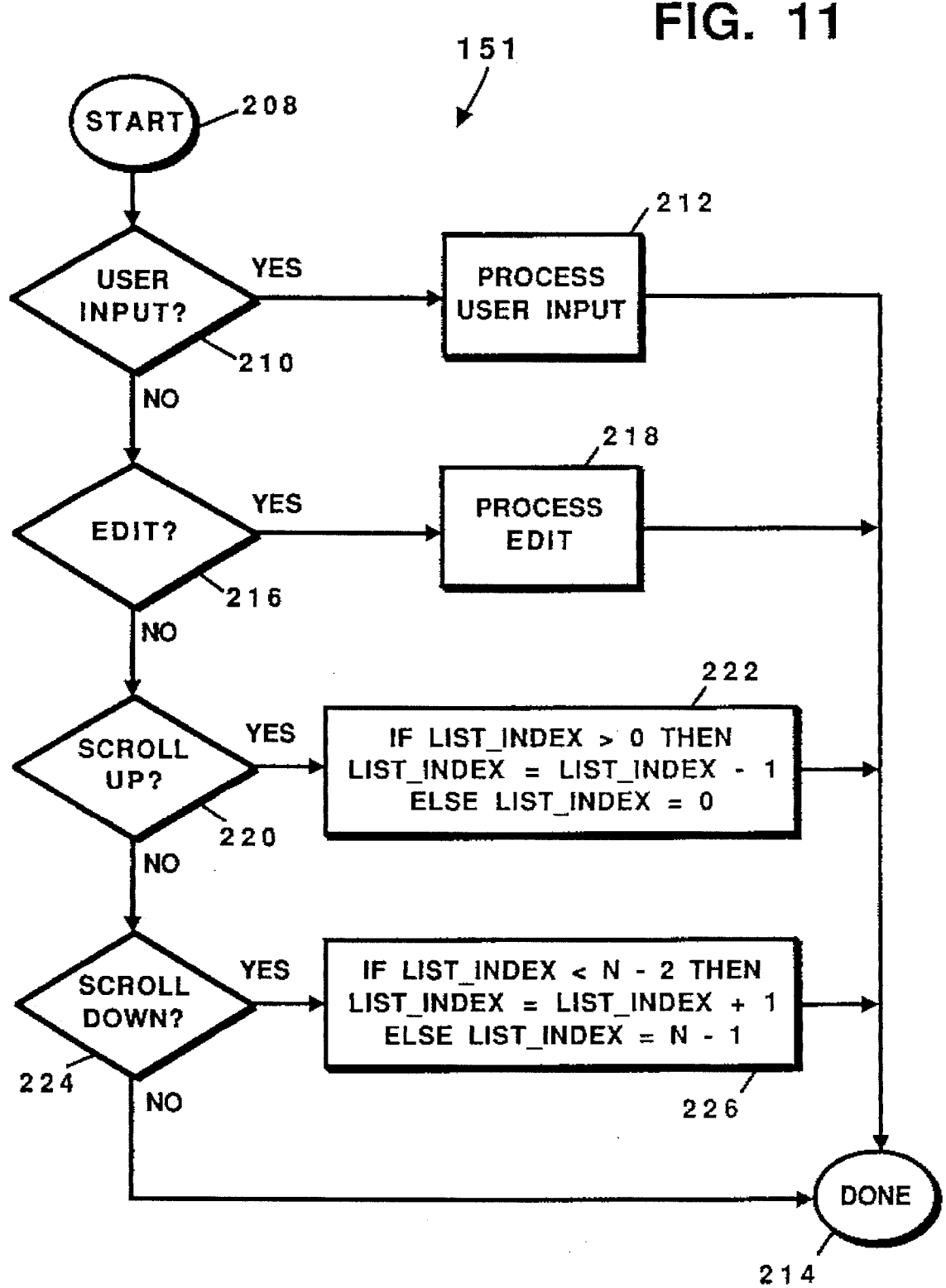
FIG. 11 is a flow diagram further illustrating the "Process Card View" step 151 of FIG. 8.

In FIG. 11, the "Process Cardview" step 151 of FIG. 8 is illustrated. The process 151 begins at 208, and a decision step 210 determines whether there is any user input. If there is, the user input is processed in step 212 and the process 151 is completed as indicated at 214. If there isn't any user input, a decision step 216 determines whether the edit button 102 has been pressed. If so, a process edit step 218 is performed and the process 151 is completed.

If the edit button 102 has not been pressed, a decision step 220 determines whether the scroll up button 90 has been pressed. If it has, a step 222 decrements the LIST_INDEX by one if LIST_INDEX>0. If LIST_INDEX≦0, then LIST_INDEX is set to zero. The process 151 is then completed as indicated at 214.

If the scroll up button 90 has not been pressed, a decision step 224 determines whether the scroll down button 92 has been pressed. If not, process 151 is completed. If the scroll down button has been pressed, a step 226 increments LIST_INDEX by one if LIST_INDEX<N−2, and sets LIST_INDEX to N−1 if LIST_INDEX≧N−2, where N is the number of records to be displayed in the list area 72. A typical value for N is 15. The process 151 is then completed.

Figure 12:
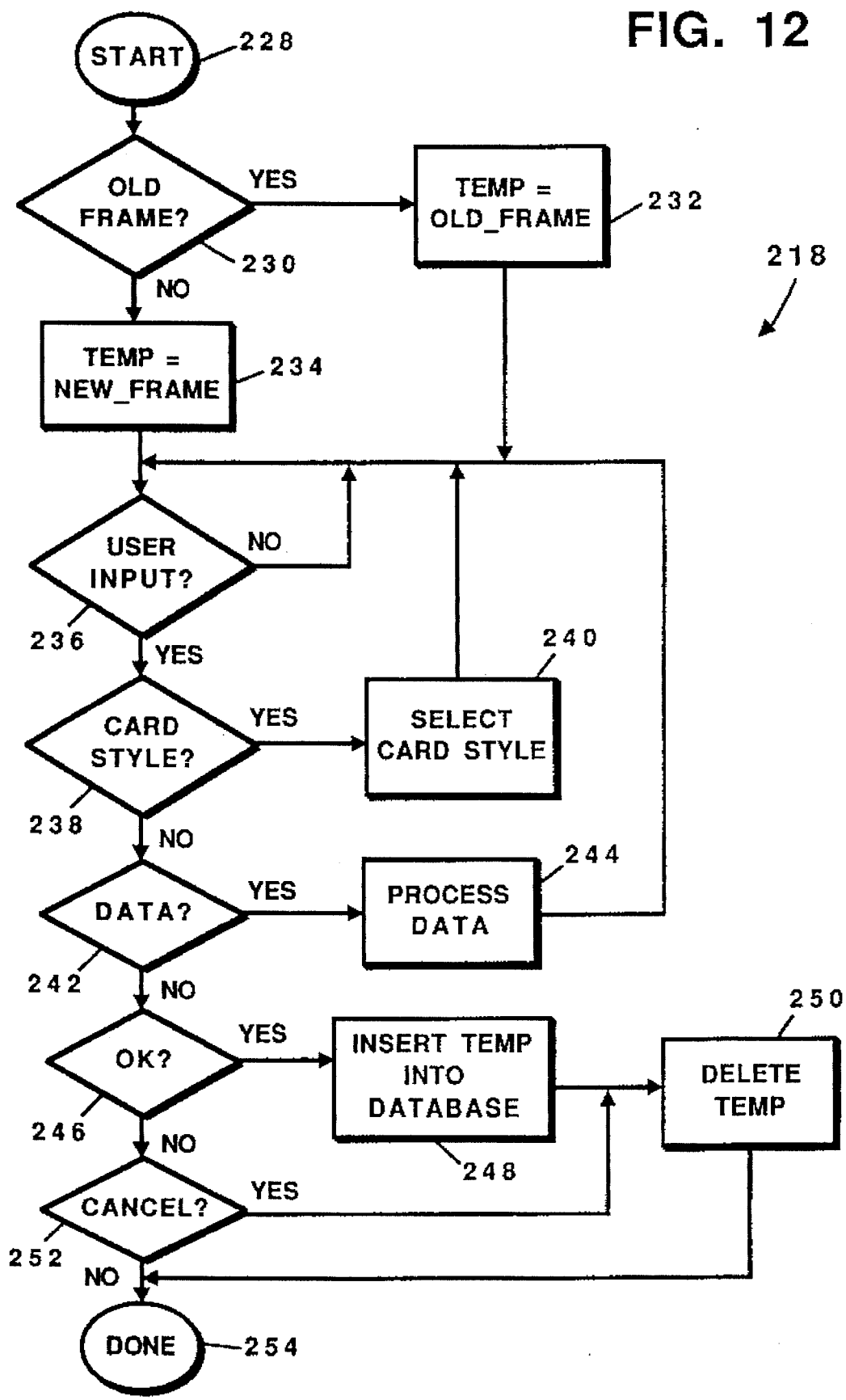
FIG. 12 is a flow diagram further illustrating the "Process Edit" step 218 of FIG. 11.

FIG. 12 illustrates the process edit step 218 of FIG. 11. The process 218 starts at 228, and a decision step 230 determines whether the user wishes to edit an existing (old) frame. If so, then a temporary frame TEMP is created by step 232 to store a copy of the old frame OLD_FRAME. If the user does not wish to edit an old frame, the temporary frame TEMP is created in a step 234 to store the value NEW_FRAME, which is a blank frame having the correct data format.

Next, in a decision step 236, it is determined whether there is any user input. If not, step 236 waits until there is user input. Of course, other processed may be running on system 10 while step 236 waits for user input.

If there is a user input, a decision step 238 determines whether the user has selected the card style button 110 (see FIG. 5). If so, the card style is selected in a step 240 and process control is returned to step 236. The activation of the card style button 110 preferably produces a list of card styles in the form of a pop-up menu, any one of which can be selected by stylus 48 in step 240. Pop-up menus and processes for implementing pop-up menus are well known to those skilled in the art.

If the user is not selecting a card style, a decision step 242 determines whether the user is entering data, such as a name, address, telephone number, etc. If data is being entered, it is processed in a step 244, and process control is returned to step 236. The process data step includes such tasks as handwriting recognition, the storage of data into the TEMP frame, etc. Processes for recognizing handwriting are well known to those skilled in the art.

If the user is not entering data, a decision step 246 determines whether the ok? button 112 has been pressed. If so, the frame TEMP is inserted into the database at LIST_INDEX (possibly overwriting OLD_FRAME) in a step 248, the frame TEMP is deleted in a step 250, and the process 218 is completed as indicated at 254.

If the ok? button 112 has not been pressed, a decision step 252 determines whether the user wishes to cancel the edits by pressing the cancel button 114. If yes, then the frame TEMP is deleted and the process is completed.

Figure 13:
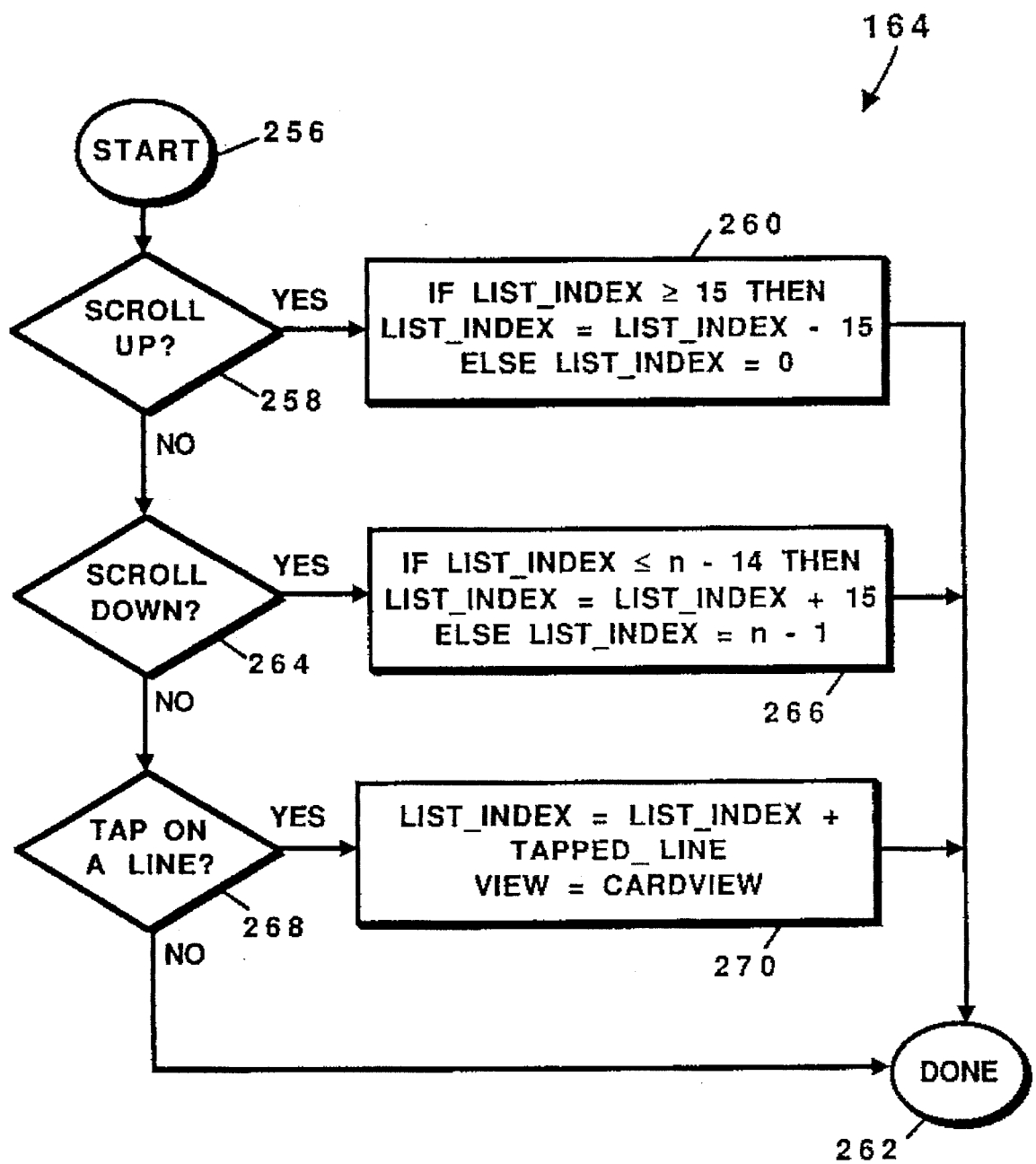
FIG. 13 is a flow diagram further illustrating the "Process List View" step of FIG. 8.

In FIG. 13, the process list view step 164 of FIG. 8 is illustrated. The process 164 begins at 256, and a decision step 258 determines whether the scroll up button 90 has been pressed. If it has, then LIST_INDEX is decremented by 15 (the preferred number of names displayed in this view) as long as LIST_INDEX is ≧15, otherwise LIST_INDEX is set to zero. The process is then completed as indicated at 262.

If the scroll up button has not been pressed, a decision step 264 determines whether the scroll down button 92 has been pressed. If so, the LIST_INDEX is incremented by 15 (again, the preferred number of displayed names) as long as LIST_INDEX≦n−14, where n is the total number of records (frames) in the database. If LIST_INDEX>n−14, then LIST_INDEX is set to n−14 to show the last 15 entries in the database.

If the scroll down button has not been pressed, a decision step 268 determines whether there has been a "tap" on one of the names, i.e. whether the stylus 48 has been placed on screen 54 over one of the names or telephone numbers listed in the list view list area 72. If there was such a tap, a step 270 set LIST_INDEX is incremented by the line number TAPPED_LINE, where the first line number has the value zero. For example, if the third name "Joe Berry" on list 72 is tapped, the number TAPPED_LINE is 2, and the value of LIST_INDEX is set to LIST_INDEX +2. Step 270 also sets VIEW_TYPE to CARDVIEW. The process is then completed as indicated at 262. The process is also completed at 262 if no tap on a line is detected in step 268.

As an option, step 270 can allow a tapped telephone number to be dialed. With this option, the tapping of a name will perform step 270 as shown in FIG. 13, but tapping on a telephone number will perform an alternate step 270' (not shown). In this alternate step, the telephone number indicated will be dialed, and the view type will remain unchanged, i.e. the view type will remain LISTVIEW. Methods for dialing telephone numbers stored in a database are well known to those skilled in the art. The process is then completed as indicated at 262.

While this invention has been described in terms of several preferred embodiments, it is contemplated that alterations, modifications and permutations thereof will become apparent to those skilled in the art upon a reading of the specification and study of the drawings. Furthermore, certain terminology has been used for the purposes of descriptive clarity, and not to limit the present invention. It is therefore intended that the following appended claims include all such alterations, modifications and permutations as fall within the true spirit and scope of the present invention.

What is claimed is:

1. A method for managing a database containing at least one entity on a pen-based computer system comprising:

determining an initial filter type from a plurality of filter types;

filtering the entities of said database to locate entities that satisfy said determined filter type;

displaying a card area on a screen of a pen-based computer system which depicts selected structured information concerning the entities that satisfy said determined filter type; and, displaying a free-form area on said screen depicting unstructured information concerning the entities.

2. A method for managing a database as recited in claim 1 further comprising the step of entering said unstructured information into said database by writing on said screen in said free-form area with a stylus means.

3. A method for managing a database as recited in claim 1 further comprising the steps of:

detecting an edit command by a user; and displaying an edit area on said screen in response to said edit command.

4. A method for managing a database as recited in claim 3 wherein said step of detecting an edit command comprises detecting the touch of said stylus means to a selected location on said screen.

5. A method for managing a database as recited in claim 4 further comprising the step of entering said structured information into said database by writing on said screen in said edit area with said stylus means.

6. A method for managing a database as recited in claim 3 further comprising the steps of:

detecting a list view command by a user; and displaying a list area on a screen which depicts selected structured information concerning a plurality of entities which is stored in said database.

7. A method for managing a database as recited in claim 6 wherein said step of detecting a list view command by a user comprising detecting a touch of said stylus means to a selected location on said screen.

8. A method for managing a database as recited in claim 6 further comprising the steps of:

detecting a touch of said stylus means to said screen over structured information pertaining to a selected one of said plurality of entities; and displaying said card area on said screen for said selected one of said plurality of entities.

9. A method for managing a database as recited in claim 8 further comprising the step of displaying said free-form area on said screen for said selected one of said plurality of entities.

10. A computerized database with card interface comprising:

a digital computation system including a central processing unit, memory means coupled to said central processing unit, display means coupled to said central processing unit, and pointer means for pointing to user selected locations on said display means;

a database comprising information pertaining to at least one entity stored in said memory means; and, a card area displayed on said display means which depicts selected structured information concerning the entities that satisfy a filter determined from a plurality of filter types.

11. A computerized database as recited in claim 10 wherein said display means comprises a touch-sensitive screen and wherein said pointer means comprises a stylus.

12. A computerized database as recited in claim 11 wherein said card area is displayed on a portion of said screen and further comprising a free-form area depicting additional information concerning said entity displayed on another portion of said screen.

13. A computerized database as recited in claim 12 further comprising means for displaying a list area on said screen which depicts selected information concerning a plurality of entities.

14. A computerized database as recited in claim 13 wherein said means for displaying a list area comprises means for detecting a list area request while said card area is displayed on said screen.

15. A computerized database as recited in claim 14 further comprising means for detecting the selection of one of said plurality of entities from said list area such that a card area and a free-form area are displayed for said selected entity.

16. A computer readable medium containing instructions for managing a database containing at least one entity on a pen-based computer system, comprising instructions for:
   a) determining an initial filter type from a plurality of filter types;
   b) filtering the entities of said database to locate entities that satisfy said determined filter type;
   c) displaying a card area on a screen of a pen-based computer system which depicts selected structured information concerning the entities that satisfy said determined filter type; and
   d) displaying a free-form area on said screen depicting unstructured information concerning the entities.

17. A computer readable medium containing instructions for managing a database as recited in claim 16, further comprising instructions for entering said unstructured information into said database by writing on said screen in said free-form area with a stylus means.

18. A computer readable medium containing instructions for managing a database as recited in claim 16, further comprising instructions for:

a) detecting an edit command by a user; and
   b) displaying an edit area on said screen in response to said edit command.

19. A computer readable medium containing instructions for managing a database as recited in claim 18, wherein said instruction for detecting an edit command comprises instructions for detecting the touch of said stylus means to a selected location on said screen.

20. A computer readable medium containing instructions for managing a database as recited in claim 19, said instructions further comprising instructions for entering said structured information into said database by writing on said screen in said edit area with said stylus means.

21. A computer readable medium containing instructions for managing a database as recited in claim 18, further comprising instructions for:
   a) detecting a list view command by a user; and
   b) displaying a list area on a screen which depicts selected structured information concerning a plurality of entities which is stored in said database.

22. A computer readable medium containing instructions for managing a database as recited in claim 21, wherein said instructions for detecting a list view command by a user comprise instructions for detecting a touch of said stylus means to a selected location on said screen.

23. A computer readable medium containing instructions for managing a database as recited in claim 21, further comprising instructions for:
   a) detecting a touch of said stylus means to said screen over structured information pertaining to a selected one of said plurality of entities; and
   b) displaying said card area on said screen for said selected one of said plurality of entities.

24. A computer readable medium containing instructions for managing a database as recited in claim 23, further comprising instructions for displaying said free-form area on said screen for said selected one of said plurality of entities.

* * * * *